No. 847,926. PATENTED MAR. 19, 1907.
J. H. FAWKES.
SPRING WHEEL.
APPLICATION FILED JAN. 5, 1906.
2 SHEETS—SHEET 1.
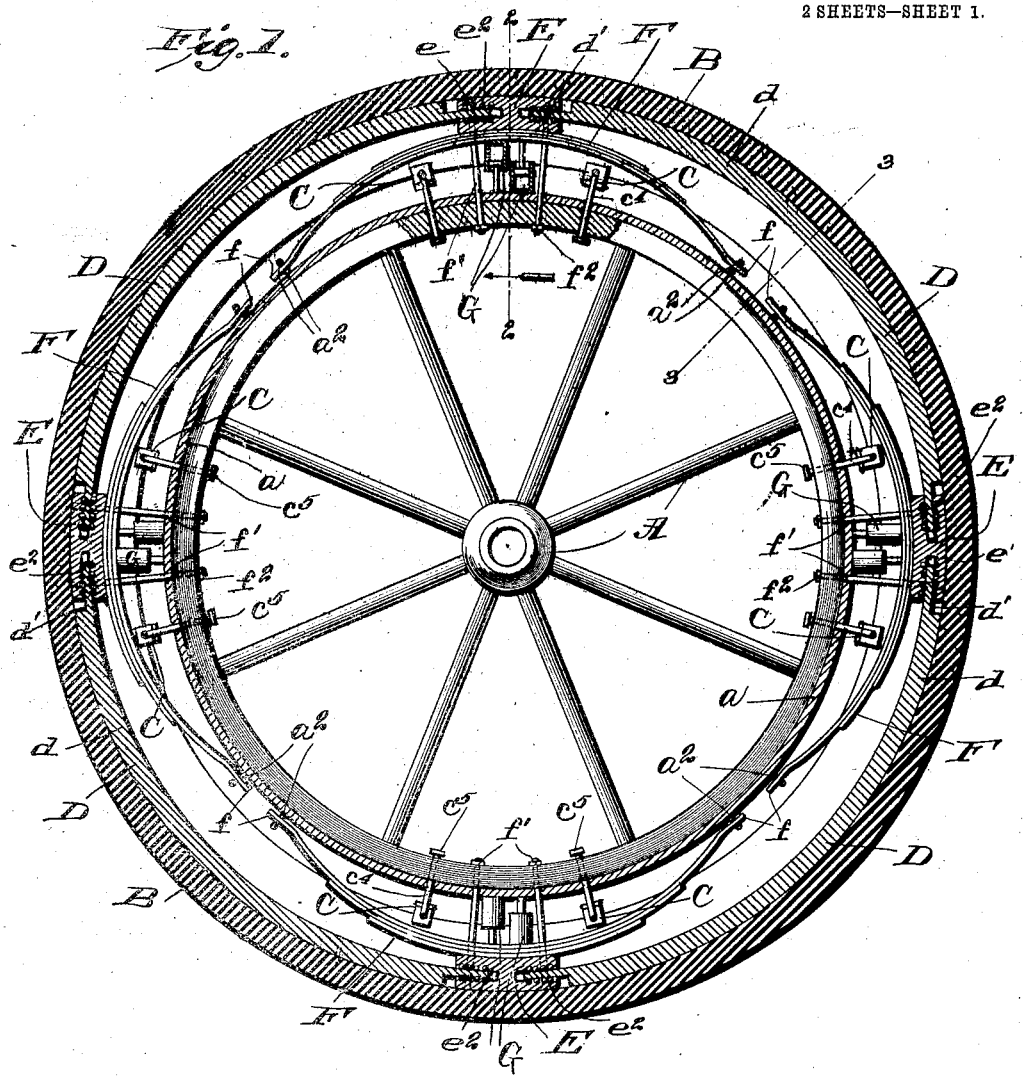
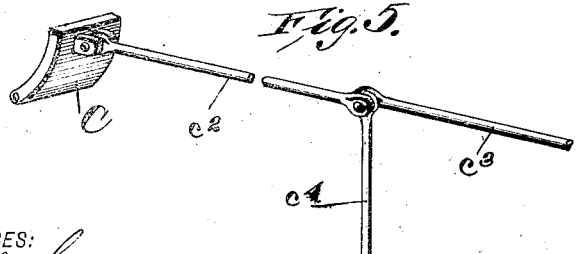
WITNESSES:
INVENTOR
JACOB H. FAWKES
BY
ATTORNEYS

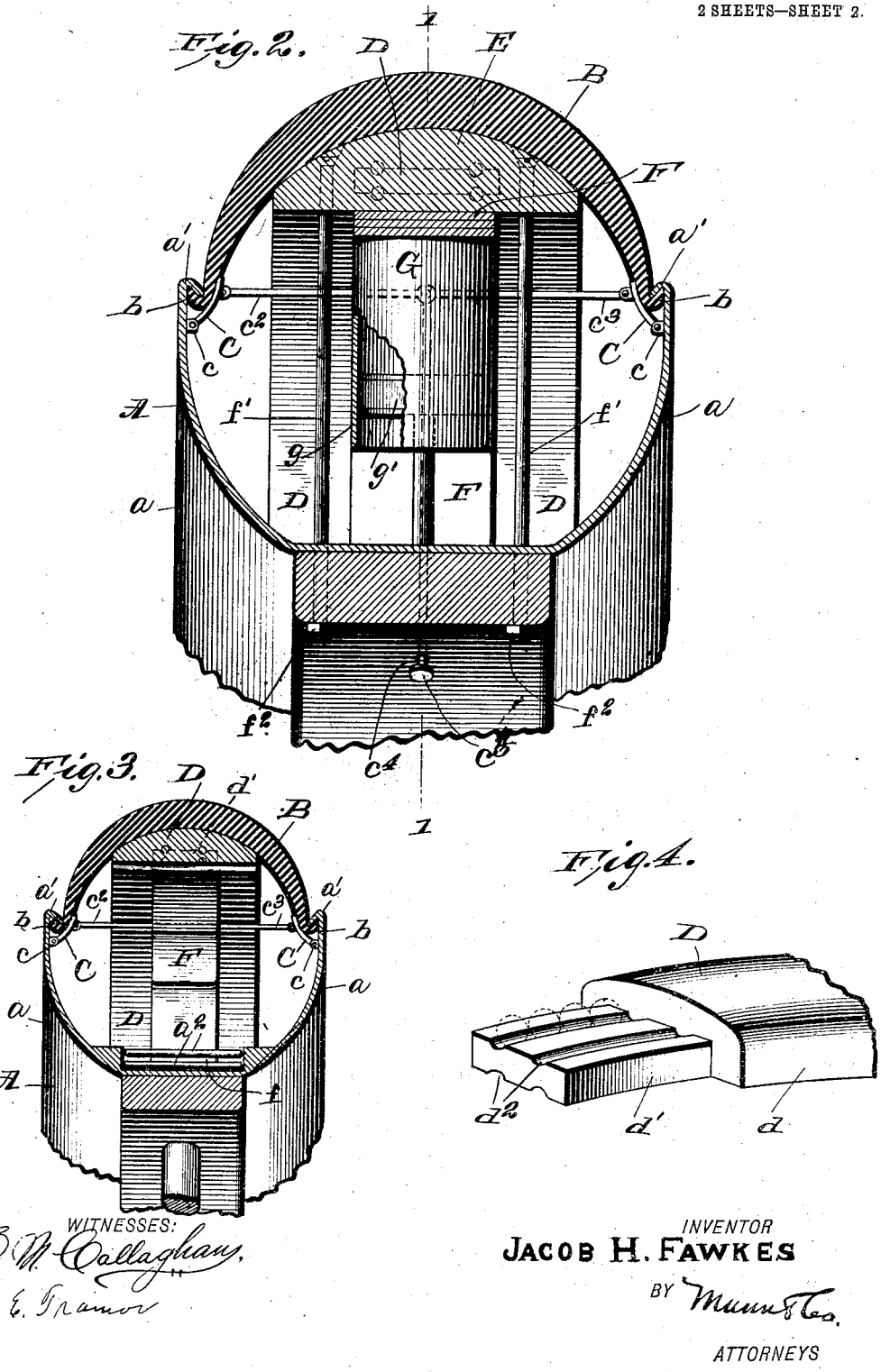

UNITED STATES PATENT OFFICE.

JACOB H. FAWKES, OF DETROIT, MICHIGAN.

SPRING-WHEEL.

No. 847,926.　　　　Specification of Letters Patent.　　　　Patented March 19, 1907.

Application filed January 5, 1906. Serial No. 294,752.

*To all whom it may concern:*

Be it known that I, JACOB H. FAWKES, a citizen of the United States, and a resident of Detroit, county of Wayne, and State of Michigan, have made a new and useful Improvement in Spring-Wheels, of which the following is a specification.

My invention is an improvement in spring-wheels, and consists in certain novel constructions and combinations of parts hereinafter described and claimed.

Referring to the drawings forming a part hereof, Figure 1 is a section of my improved wheel, taken on the line 1 1 of Fig. 2. Fig. 2 is a section on the line 2 2 of Fig. 1 looking in the direction of the arrow. Fig. 3 is a section on the line 3 3 of Fig. 1. Fig. 4 is a detail perspective view of the end of a section of the inner tire, and Fig. 5 is a detail perspective view of the tire-retaining arm and its connecting mechanism.

In the practical application of my invention I provide a wheel A, having a concave rim $a$ approximately semicircular in cross-section and provided with inwardly-projecting flanges $a'$ at its edges.

A tire B, of rubber or other suitable flexible material approximately semicircular in cross-section, is provided with outwardly-projecting flanges $b$ for engaging the flanges of the rim, the flanges being maintained in interlocking relation with each other by means of a plurality of arms C, pivoted to oppositely-arranged brackets $c$ upon the inner face of the rim adjacent to the flanges and adapted to be forced into contact with the inner face of the tire, near the edge thereof, by means of a toggle comprising members $c^2$ $c^3$, pivoted by their outer ends to opposite arms and by their inner ends to each other. A rod $c^4$ is pivoted to both members of the toggle at their connection and extends through an opening in the rim $a$, the outer end of the rod being provided with a head $c^5$ for convenience in manipulating the same.

It will be understood that when the rod is drawn downwardly to break the toggle the pivoted arms are moved toward each other and away from the inner face of the rim, thus permitting the release of the interlocking flanges. A reverse motion of the rod forces the arms into contact with the tire, thus firmly locking the flanges. In the form of my invention shown in Fig. 1 eight pairs of arms are shown; but it is evident that more or less might be used, as desired.

An inner tire D, preferably of metal and comprising a plurality of sections $d$, is arranged within the outer tire for supporting the same, the sections being of a width somewhat less than that of the outer tire and spaced apart from each other around the periphery of the wheel. The ends of the sections are provided with bearing-plates $d'$, provided on their upper and lower faces with grooves $d^2$, the bearing-plates being received in recesses $e$ in bearing-blocks E, arranged between the spaced ends of the sections, the faces of the recesses being provided with grooves $e'$, coacting with the grooves $d^2$ for forming ball-races for the reception of balls $e^2$, arranged between the bearing-plates and the bearing-blocks.

The sections of the inner tire are of sufficient thickness to support the outer tire and are preferably constructed of some light material, as aluminium. It will be evident that when pressure is made upon the outer tire between the bearing-blocks the section of the inner tire thereunder may yield, the ends of the section sliding freely in the bearing-blocks. Leaf-springs F are secured by their centers to the inner faces of the bearing-blocks, and extend in either direction thereof, the free ends $f$ being received between friction-rollers $a^2$, journaled between the sides of the rim. Bolts $f'$ traverse the bearing-blocks upon either side of the recesses and extend inwardly through the rim, being retained in place by nuts $f^2$. The bolts $f'$ permit free inward movement of the bearing-blocks with respect to the rim, but restrain the outward movement thereof.

An air-cushion G is arranged between the leaf-spring and the rim beneath the bearing-block, comprising in the present instance a plurality of cylinders $g$, one secured to the rim and one to the spring, in which move pistons $g'$, one of said pistons being attached to the rim and the other to the spring—that is, the cylinders and the pistons are arranged reversely with respect to each other.

While I have shown my improved wheel as provided with four springs, it is evident that more or less might be used with equal facility, the number used depending upon the nature of the load to be carried by the wheel.

It will be evident that by the use of my improved wheel a considerable amount of rubber is saved in the tire, since one-half of the ordinary tire is dispensed with, thus permitting the construction of tires of greater diameter with the same amount of rubber as now used in tires of much smaller diameter.

I claim—

1. In combination, a spring-wheel provided with a concave rim semicircular in cross-section, and having inwardly-flanged edges, a tire semicircular in cross-section and having outwardly-flanged edges for engaging the flanged edges of the rim, means for retaining the edges in interlocking relation, an inner metallic tire comprising a plurality of sections spaced apart from each other, bearing-plates on the ends of the sections, a bearing-block between the adjacent bearing-plates and provided with recesses for receiving the same, a leaf-spring secured by its center to the bearing-block, a pneumatic cushion between the bearing-block and the rim, means for limiting the outward movement of the bearing-block with respect to the rim, and rollers journaled on the rim for receiving the free ends of the spring.

2. In combination, a spring-wheel provided with a concave rim having inwardly-flanged edges, a tire having outwardly-flanged edges for engaging the edges of the rim, means for maintaining the edges of the rim and the tire in contact, an inner metallic tire comprising a plurality of sections spaced apart longitudinally from each other, bearing-plates on the ends of the sections, bearing-blocks between the sections having recesses to receive the bearing-plates, a leaf-spring secured to the bearing-blocks and extending upon each side thereof, the ends of the springs engaging the outer face of the rim.

3. In combination, a spring-wheel provided with a concave rim having inwardly-projecting flanged edges, a tire having outwardly-flanged edges for engaging the edges of the rim, means for maintaining the edges of the rim and the tire in contact, an inner metallic tire comprising a plurality of sections spaced apart longitudinally from each other, bearing-plates on the ends of the sections, bearing-blocks between the sections having recesses to receive the bearing-plates, and leaf-springs arranged between the bearing-blocks and the rim.

4. In combination, a spring-wheel provided with a concave rim having inwardly-flanged edges, a tire having outwardly-flanged edges for engaging the edges of the rim, an inner metallic tire comprising a plurality of sections spaced apart longitudinally from each other, bearing-plates on the ends of the sections, bearing-blocks between the sections having recesses for receiving the bearing-plates, and leaf-springs arranged between the bearing-blocks and the rim.

5. In combination, a spring-wheel provided with a concave rim having inwardly-flanged edges, a tire having outwardly-flanged edges for engaging the edges of the rim, an inner metallic tire comprising a plurality of sections spaced apart longitudinally from each other, bearing-plates on the ends of the sections, bearing-blocks between the sections having recesses for receiving the bearing-plates, and springs arranged between the bearing-blocks and the rim.

6. In combination, a spring-wheel provided with a concave rim having inwardly-flanged edges, a tire having outwardly-flanged edges for engaging the edges of the rim, an inner metallic tire comprising a plurality of sections spaced apart longitudinally from each other, bearing-plates on the ends of the sections, bearing-blocks between the sections having recesses to receive the bearing-plates, and cushioning devices between the bearing-blocks and the rim.

7. In combination, a spring-wheel provided with a concave rim having inwardly-flanged edges, a tire having outwardly-flanged edges for engaging the edges of the rim, an inner rim comprising a plurality of sections spaced apart longitudinally from each other, bearing-plates on the ends of the sections, bearing-blocks between the sections having recesses to receive the bearing-plates, cushioning devices between the bearing-blocks and the rim, and means for limiting the outward movement of the bearing-blocks with respect to the rim.

8. In combination, a spring-wheel provided with a concave rim having flanges at the edges thereof, a tire having flanges for engaging the flanges of the rim, and means for retaining the flanges in locking engagement comprising pairs of oppositely-arranged arms pivoted to the rim adjacent the flanges thereof, a toggle-lever connecting the arms, and a rod connected to the hinge of the toggle-lever and extending without the rim.

9. In combination, a spring-wheel provided with a concave rim having flanges at the edges thereof, a tire having flanges for engaging the flanges of the rim, and means for maintaining the flanges in locking engagement comprising pairs of oppositely-arranged arms pivoted to the rim adjacent the flanges thereof, a toggle-lever connecting the arms, and means for manipulating the toggle-lever.

JACOB H. FAWKES.

Witnesses:
W. K. HAINES,
HUGH L. GLENN.